R. T. NEWTON.
BUMPER BRACKET.
APPLICATION FILED MAR. 17, 1922.
1,422,777. Patented July 11, 1922.
3 SHEETS—SHEET 1.
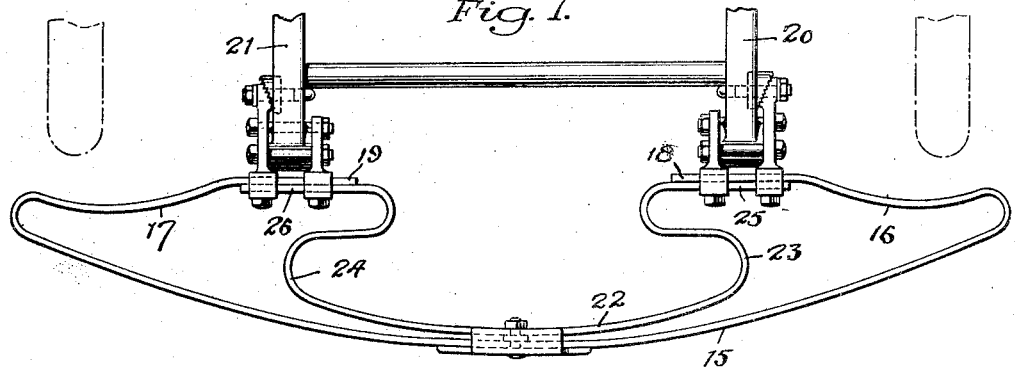
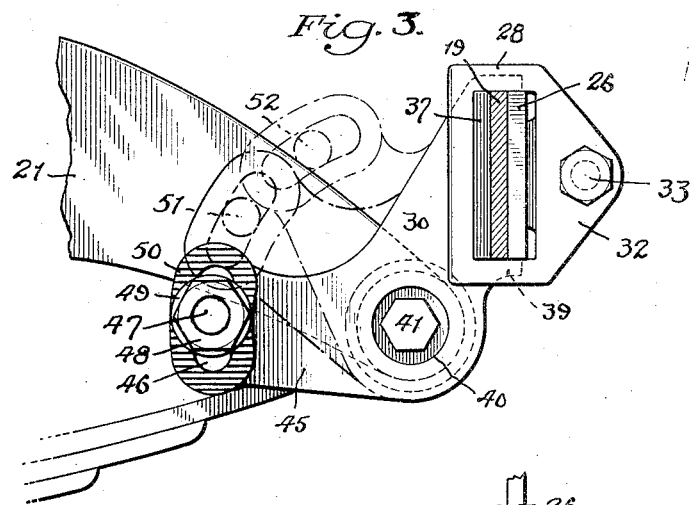
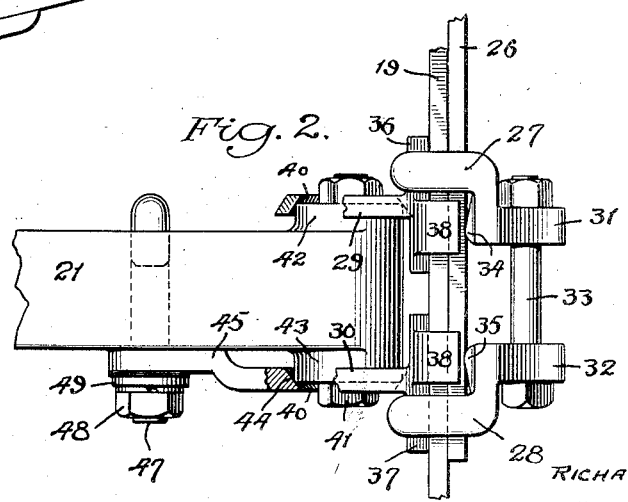
INVENTOR
RICHARD T. NEWTON
BY
ATTORNEYS

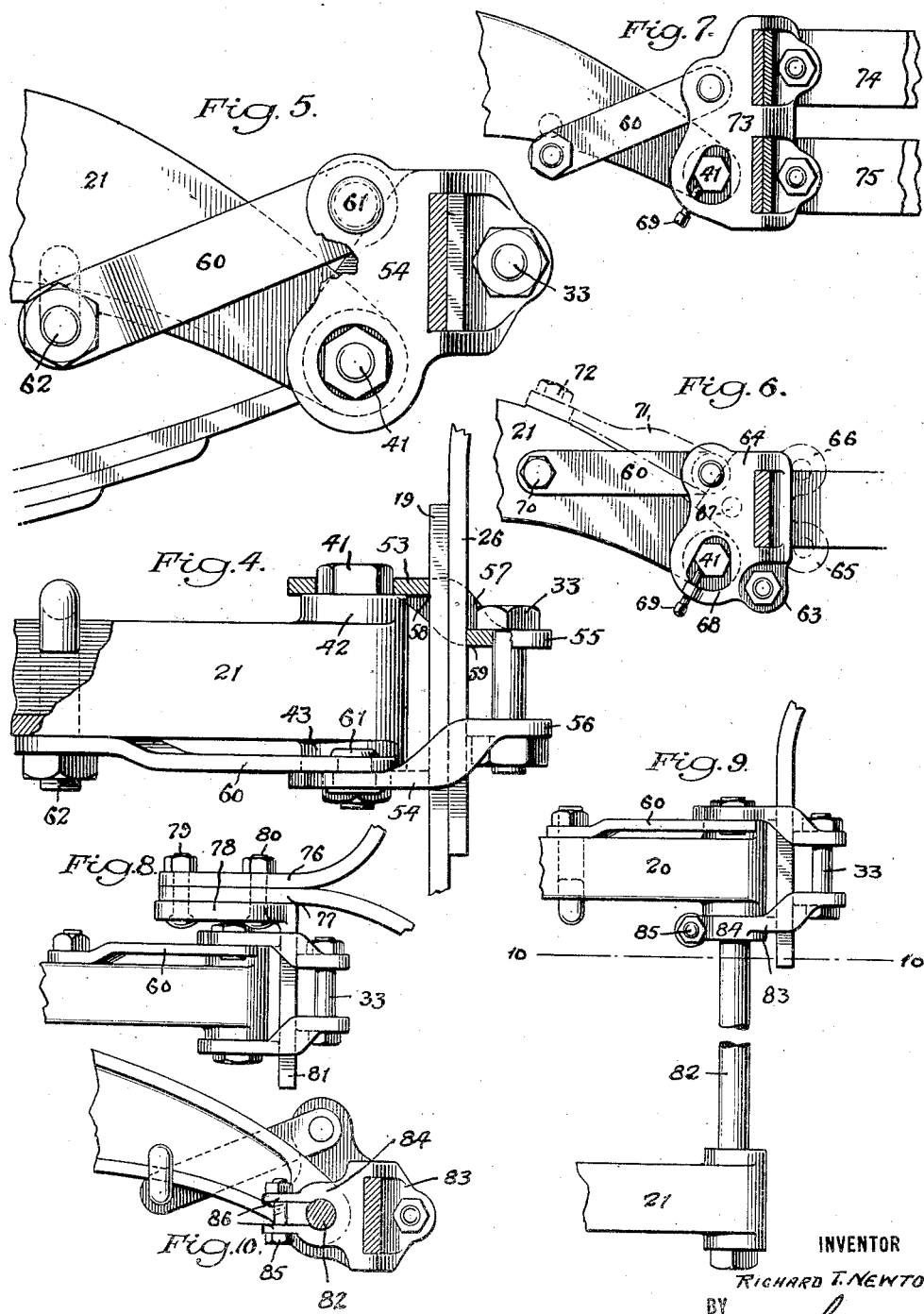

UNITED STATES PATENT OFFICE.

RICHARD T. NEWTON, OF NEW YORK, N. Y.

BUMPER BRACKET.

1,422,777. Specification of Letters Patent. Patented July 11, 1922.

Application filed March 17, 1922. Serial No. 544,462.

*To all whom it may concern:*

Be it known that I, RICHARD T. NEWTON, a citizen of the United States of America, residing at New York city, borough of Manhattan, in the county of New York and State of New York, have invented certain new and useful Improvements in Bumper Brackets, of which the following is a specification.

My invention relates to bumper brackets, and the object of my invention is to provide a bracket of substantially universal utility, readily adapted to bumpers of many different types, and to automobile chassis having their side bars, or equivalent brackets, variously spaced apart.

The present application is in part a division and in part a continuation of my copending application, Serial No. 475,704, filed June 7, 1921.

In the accompanying drawings—

Fig. 1 is a plan view of a bumper and a supporting bracket illustrating a type of bumper to which the invention may be applied;

Fig. 2 is a broken plan view of a bracket in which my invention is embodied in one form;

Fig. 3 is a side elevation thereof;

Fig. 4 is a broken plan of a bracket of somewhat simplified construction;

Fig. 5 is a broken side elevation thereof;

Fig. 6 is a side elevation of a slightly modified construction;

Fig. 7 is a side elevation of a further modification;

Fig. 8 is a plan view illustrating the use of the bracket shown in Figs. 4 and 5 applied to a modified bumper construction;

Fig. 9 is a plan view illustrating a further modification of the bracket to adapt it to a chassis construction of modified type;

Fig. 10 is a section on the line 10—10, Fig. 9;

Figure 11:
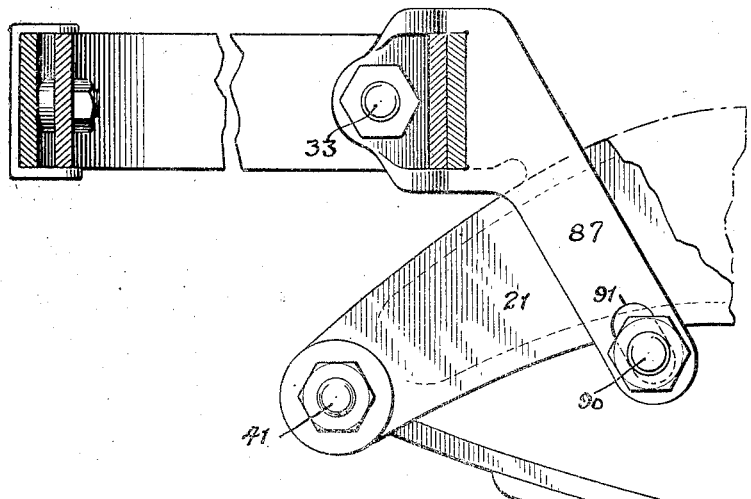
Fig. 11 is a side elevation of a further modification of the bracket by which it is adapted for a different mounting on the chassis side bar.

The thought which underlies the invention is a bracket construction such that the same means that secure the bumper attaching elements to the bracket, simultaneously mount the bracket on the chassis, or its equivalent, associated with means by which the bracket may be angularly adjusted on the chassis to locate the bumper in horizontal position. As will be readily recognized from an inspection of the drawings, the thought is susceptible of embodiment in various forms, only some of which are illustrated. Furthermore, the invention is applicable to bumpers of various types, and its utility is not limited to the type shown.

In Fig. 1 I have shown a bumper of convenient type for illustration, comprising an impact member 15 of spring strap metal, the opposite ends of which are re-curved to form spring supporting arms 16 and 17. The attaching ends 18 and 19 thereof lie substantially at right angles to the planes of the chassis side bars 20 and 21, to which they are respectively secured by brackets of one of the types shown in my copending application above mentioned. The bumper also comprises an inner arch 22, the opposite ends of which are re-curved to form supporting arms 23 and 24. The attaching ends 25 and 26 of the latter, register with the attaching ends 18 and 19 of the supporting arms of the impact member, and are secured by the same brackets which support the impact member.

The bracket construction shown in Figs. 2 and 3 hereof is that illustrated in Figs 8 and 9 of my copending application above mentioned. In this form it comprises a pair of loop members 27 and 28 and associated side plate members 29 and 30. The eyes of the loop members 27 and 28 are shaped to receive the attaching ends of the bumper elements. Inasmuch as the brackets which support the bumper are alike in principle, I have illustrated only the one associated with the chassis side bar 21, in Figs. 2 and 3. As indicated, both of the attaching ends 19 and 26 of the impact and arch-like members of the bumper pass freely through the eyes of the loop members 27 and 28, which are provided with forwardly extending lugs or ears 31 and 32, pierced in register to receive the draw-up bolt 33. Bearing bosses 34 and 35 may be formed on the inner faces of these lugs.

The side plate members 29 and 30 of the bracket are provided with transversely extending head flanges 36 and 37, the remote ends of which also pass through the eyes of the loop members 27 and 28, while the adjacent ends thereof are provided with top and bottom flanges 38 and 39 to assist in supporting and aligning the attaching ends 19 and 26 of the bumper elements. In the form here shown, the plate elements are apertured at 40 to accommodate the opposite ends of the usual spring bolt 41. The sides of the apertures are preferably beveled to fit upon and engage the usual hubs 42 and 43 of the spring bolt casting which is riveted or otherwise secured in usual manner to the forward end of the chassis side bar. The beveled walls 44 of the apertures in the side plates adapt the plates to fit hub bosses of different diameters, there being some variation in the size of the hubs in different makes of cars.

The side plate 30 is formed with an extension 45, the end of which is provided with an arcuate slot 46 struck on an axis having its center coaxial with the hole 40 which fits the hub 43 of the casting. Passing through the slot 46 is an anchor bolt 47, here shown as of the hook bolt type, the hook end of which engages the lower flange of the chassis side bar. Associated with the nut 48 for the bolt 47 is a serrated washer 49, adapted to engage the serrated face 50 of the arm 45, thus holding the bracket in the angular position to which it is adjusted by swinging the bracket on the axis of the hubs 42 and 43 to horizontally position the bumper. I have indicated in Fig. 3 alternative locations of the bolt 47 which may be passed through a hole drilled in the chassis side bar at 51, or arranged above the chassis side bar at 52, if desired. The angular relation between the extension arm 45 and the plate 30 is of course varied in accordance with the proposed location of the anchor bolt 47.

To secure the bracket to the bumper and to the chassis, it is merely necessary to slip the attaching ends 19 and 26 of the bumper arms through the eyes of the loop members 27 and 28, position the plate members 29—30 on opposite sides of the chassis side bar, and in engagement with the hubs 42 and 43 of the end casting, shift the loops 27 and 28 over the remote ends 36 and 37 of the heads of the side plates, insert the bolt 33 through the flanges 31 and 32, and tighten up the nut on the bolt. As the nut is turned down on the bolt, not only are the two loop members drawn toward each other, and the plates 29 and 30 thus clamped upon the head of the chassis side bar, but the loop members are also cramped against attaching ends 19 and 26 of the bumper supporting arms, thus firmly engaging the same and securing all of the elements together upon the end of the chassis side bar by means of the single draw-up bolt 33. Before the latter is given its final tightening, the horizontal position of the bumper is obtained by swinging the bracket on the axis of the hubs 42 and 43.

The nut 48 on the anchor bolt 47 may now be turned down hard to hold the bracket in its angularly adjusted position.

The construction just described may be simplified as illustrated in Figs. 4 and 5, by combining the loop members 27 and 28 and the side plates 29 and 30 into a single pair of castings, 53 and 54. Each of the castings is apertured at its forward end to receive the clamping bolt 33, and at its rear end to fit over the head of the spring bolt 41. Intermediate the forward and rear ends, the plates are pierced to form eyes through which the attaching ends 19 and 26 of the bumper supporting arms are passed. I prefer to offset the forward ends 55 and 56 of the castings from the bodies of the latter to form, at the eyes, relatively wide bottom webs 57, upon which the bumper attaching ends rest, and also to accentuate the cramping engagement of the bumper ends between the edges 58 and 59 of the eye openings in the plates. This construction also simplifies the mounting of the plates on the bumper ends, and lessens the size of the apertures in the plates since it is not necessary in this construction to have the openings large enough to receive not only the bumper attaching ends, but also the head flanges 36 and 37 of the side plates, as in the construction first described.

The angular adjustment of the bracket with regard to the chassis side bar is secured by a link 60 pivoted at 61 to the side plate 54 and apertured at its opposite end to receive the shank of the hook bolt 62 which engages the bottom flange of the chassis side bar 21. The angular adjustment is secured by the longitudinal displacement of the hook bolt on the chassis side bar.

In the construction just described, the side plates 53 and 54 bear against the head and nut respectively of the spring bolt 41, and are not shaped to engage the bosses 42 and 43 by the spring bolt casting. Obviously the plates may be shaped to the latter if preferred, but the spring bolt 41 is ordinarily sufficiently strong to take care of any thrusts which the bumper itself can withstand.

In Fig. 6 a further modification is illustrated. In its main features it corresponds precisely with the construction just described, but the location of the draw-up bolt 33 has been shifted. As illustrated, the lugs 63 are located below the bumper receiving apertures in the side plates 64. That the location of the draw-up bolt 33 is optional is indicated by the dotted lugs 65 and 66 indicated in this figure, the location of the bumper receiving apertures being suitably shifted to afford clearance for the draw-up bolt. In fact the draw-up bolt may be passed through registering holes 67 in the plates located at any convenient point. The holes 68 which accommodate the spring bolt 41 are also modified in this view, to accommodate bolt heads or nuts of different size. Thus the hole 68 is of wedge shape, and a set screw 69 is provided which bears against the bolt head or nut to prevent rattling or displacement under the vibrations to which parts are subjected when the car is in motion. The location of the link 60 may also vary. I have here shown it secured by a bolt 70 passing through a hole drilled in the chassis side bar 21 at an appropriate point, which may be located when the bumper is installed. If desired, the link may be positioned on top of the chassis side bar, as indicated in dotted lines at 71, and secured by a bolt 72 passing through a hole or slot in the top flange of the chassis side bar. It will of course be understood that these modifications may be applied to any of the brackets.

In Fig. 7 I have illustrated a construction substantially like that shown in Figs. 4, 5 and 6, except that the bracket side plates, 73, are made of sufficient vertical height to accommodate a pair of superposed apertures in which are received the attaching ends of two superposed bumpers 74 and 75 of the same general type.

In Fig. 8 I have shown a bracket of the type illustrated in Figs. 4 and 5, employed to secure a bumper in which the attaching ends 76 and 77 are carried back parallel with the chassis side bars. In such case an attaching member 78 is secured by bolts or rivets 79 and 80 to the bumper ends, and is provided with a cross bar 81 which passes through the eyes of the bracket plates and is engaged by the latter in precisely the same way as the attaching ends of the bumper supporting arms. Inasmuch as the function and operation of the bracket are identical in both cases, I use the expression "bumper attaching elements" in the subjoined claims in a sense broad enough to include such an attaching element as is here shown.

In Figs. 9 and 10 I have indicated a further modification of the bracket to adapt it to a reinforcing bar 82 extending across the front of the car between the ends of the chassis side bars. In its essential features the bracket plates are identical with the construction above described, but one of the plates 83 is provided with a boss 84 which may be split to embrace the cross bar 82, to which it is secured by a clamping bolt 85 passing through the split end 86. In these figures, as well as in Fig. 6, I have indicated a bumper of the single bar supporting arm type, the size of the apertures in the side plates being suitably reduced to meet the reduced thickness of metal of the one-ply attaching end of the bumper supporting arm.

Figure 12:
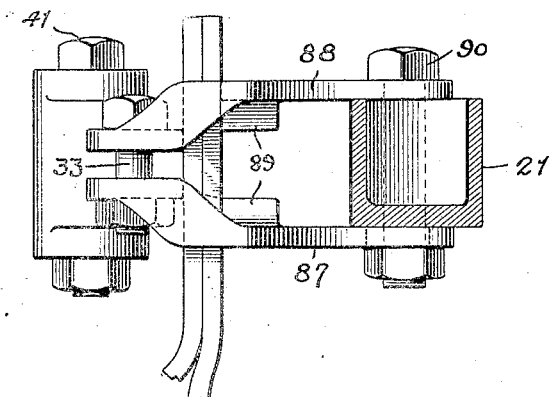
Fig. 12 is a plan view thereof.

In Figs. 11 and 12 a further modification is illustrated, in which the side plates 87 and 88 are clamped on opposite sides of the chassis side bar at a point spaced inward from the spring bolt 41. The webs which form the bottom of the apertures in which the bumper ends are accommodated, are extended to form supporting flanges 89 which rest upon the upper face of the chassis side bar 21, and the bracket is angularly adjusted by swinging it on the flanges as a pivot. Its adjusted position is maintained by the anchor bolt 90, passed beneath the chassis side bar and through the slots 91 in the downwardly projecting ends of the bracket side plates.

Figure 13:
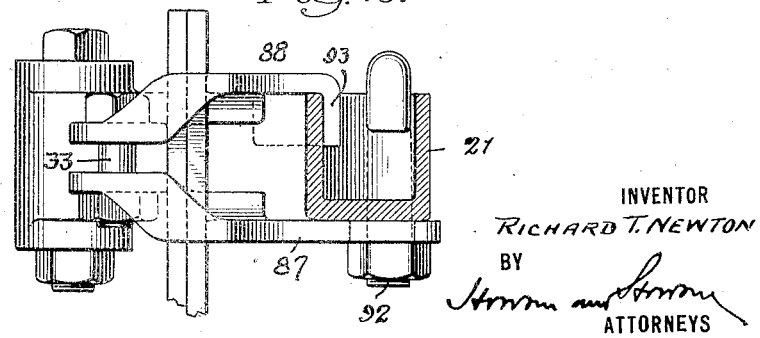
Fig. 13 is a plan view of still another modification of the bracket construction.

In Fig. 13 only the side bar 88 is carried downward to receive the adjusting bolt 92, which may be a hook bolt of common type engaging the lower flange of the chassis side bar. The plate 87 is provided with an inwardly offset flange 93, which engages beneath the top flange of the chassis side bar.

In all of the constructions shown, the bumper attaching ends are secured in the bracket by the same means which mount the bracket on the chassis side bar, or its equivalent. In other words, the same means which serve to draw the side plates of the bracket into clamping engagement with the support, serve simultaneously to cramp the side plates into engagement with the bumper attaching element.

In all cases, supplemental means are provided for angular adjustment of the bracket to properly position the bumper.

In all of the constructions, the brackets may be successfully used regardless of the spacing of the chassis side bars or the equivalent supports, so long as the bumper attaching elements are of sufficient length to be engaged by the bracket.

In all of the constructions the strength of the bumper is in no way impaired by the attaching means, since it is not necessary to form apertures to receive securing bolts.

In all of the constructions the thrust of the impact against the bumper is transmitted directly to the chassis side bar, or to an element thereof having ample strength to resist thrusts which the bumper itself can withstand.

In all of the constructions the bumper is supported close to the chassis frame, or its equivalent, so that the bumper does not project objectionably far in front of the car wheels.

While I have shown various modified embodiments of the underlying thoughts of my invention, many others will readily occur to those skilled in the art, which do not depart from what I claim as my invention.

I claim—

1. In bumper supporting means, a member adapted to be cramped into engagement with a bumper attaching element, and means for effecting said cramping engagement.

2. In bumper supporting means, a member apertured to freely receive a bumper attaching element, and means for cramping said member into engagement with said attaching element.

3. In bumper supporting means, a pair of members apertured to freely receive a bumper attaching element, and means common thereto for cramping said members into engagement with said attaching element.

4. In bumper supporting means, a pair of members adapted to straddle a support, and apertured to freely receive a bumper attaching element, together with means for clamping said members on the support and for cramping them into engagement with said attaching element.

5. In bumper supporting means, a pair of members adapted to straddle a support, and apertured to freely receive a bumper attaching element, together with means for simultaneously clamping said members on the support and for cramping them into engagement with said attaching element.

6. In bumper supporting means, a member apertured to receive a bumper attaching element and having bearing points longitudinally spaced thereon, together with means for displacing said member angularly with respect to said attaching element to cramp the latter between said spaced bearing points.

7. As an element of a bumper supporting bracket, a member apertured to freely receive a bumper attaching element, said member bearing against opposite sides of said attaching element at longitudinally spaced points.

8. In bumper supporting means, a member adapted to freely receive a bumper attaching element, and means engaging said member and exerting effort in a direction substantially parallel to said attaching element to cramp said member to the latter.

9. In a bumper mounting, a supporting member, a bumper attaching element extending substantially at right angles to the plane of said supporting member, a bracket device for mounting the bumper on the supporting member, and means extending in the plane of said bumper attaching end for cramping the latter to the bracket, and for securing the bracket to the supporting member.

10. In a bumper mounting, a bumper attaching element extending transversely to the plane of a chassis support, a bracket comprising a pair of plate-like members adapted to straddle said support and being apertured to freely receive the bumper attaching element, and draw-up means uniting said side plates to draw the same into engagement with opposite sides of said support and to angle the same into cramping engagement with the bumper attaching element.

11. In a bumper mounting, a bumper attaching element extending transversely to the plane of a chassis support, a bracket comprising a pair of plate-like members adapted to straddle said support and being shaped to engage an abutment element thereof, and apertured to freely receive the bumper attaching element, and draw-up means uniting said side plates to draw the same into engagement with opposite sides of said support and to angle the same into cramping engagement with the bumper attaching element.

12. In a bumper mounting, a bumper attaching element extending transversely to the plane of a chassis support, a bracket comprising a pair of plate-like members adapted to straddle said support and being apertured to freely receive the bumper attaching element, and draw-up means uniting said side plates to draw the same into engagement with opposite sides of said support and to angle the same into cramping engagement with the bumper attaching element, together with means for securing the bracket in angularly adjusted position with respect to said chassis support.

In testimony whereof I have signed my name to this specification.

RICHARD T. NEWTON.